Patented Aug. 25, 1942

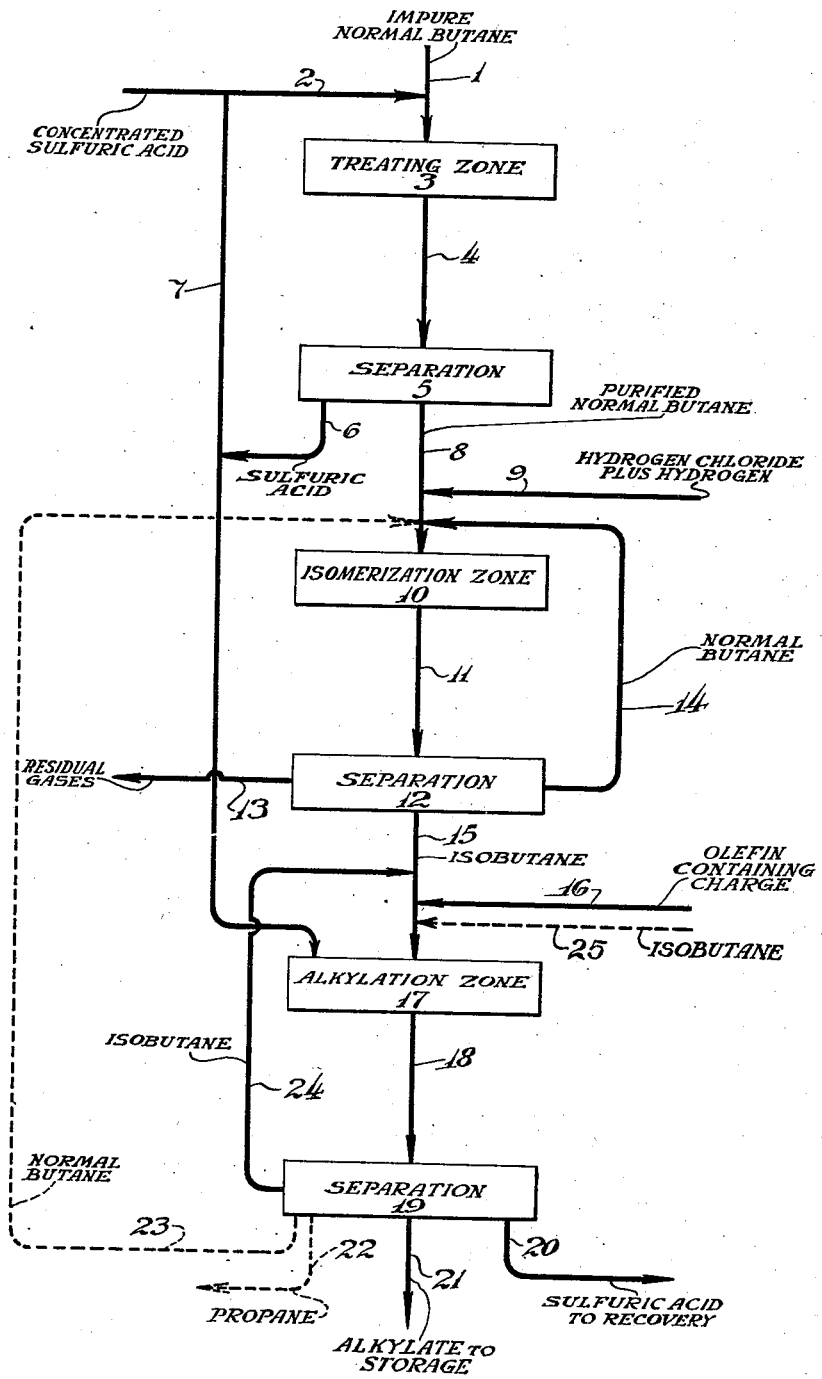

2,293,705

UNITED STATES PATENT OFFICE 2,293,705

TREATMENT OF PARAFFIN HYDROCARBONS

Herman S. Bloch, Chicago, Ill., assignor to Universal Oil Products Company, Chicago, Ill., a corporation of Delaware Application July 31, 1940, Serial No. 348,960

11 Claims. (Cl. 196—10)

This invention relates to the production of saturated motor fuel of high octane value. In a more specific sense the invention is concerned with a process for the preparation of a motor fuel by isomerizing normal butane to isobutane and alkylating said isobutane with an olefin to form an alkymer of the motor fuel boiling range.

The process is useful for the conversion of light hydrocarbons into motor fuel and consists in the interaction of isoparaffins and olefins in the presence of strong acids, such as sulfuric acid. Under appropriate conditions, the reaction

isoparaffin+olefin=isoparaffin' takes place with a minimum production of olefin polymer or heavy products. As this reaction, commonly known as alkylation, does not take place readily with normal paraffins, the proposal has been made to subject normal butane and other normal paraffins to the action of a catalyst to cause isomerization to the iso compound. Catalysts commonly used for this isomerization process include aluminum chloride, zirconium chloride, copper chloride, zinc chloride and iron chloride. These catalysts do not possess an equivalent action and in some cases are effective principally in combination with other members of the group. For example, it has been found that aluminum chloride alone or in a combination with any of the other four metal chlorides above mentioned constitutes an effective isomerization catalyst. It has been found advantageous in many cases to employ supporting materials for the above catalysts for in the absence of a support the catalyst tends to form adhesive sludge materials with resulting decrease in catalytic activity. Among the supporting materials which have been shown to have practical value as carriers may be mentioned activated carbon, pumice, various types of fuller's earths and clays, particularly those of the montmorillonite and bentonite types, either raw or acid treated, diatomaceous and infusorial earths, kieselguhr, silica-alumina composites, unglazed porcelain, firebrick and in general refractory porous substances which have substantially no reactivity with the anhydrous chlorides.

In the isomerization of normal butane it has been found that small percentages of impurities, such as moisture, olefins, and possibly sulfur and nitrogen compounds have the effect of reducing the life of the catalyst to a marked extent. The present invention provides a means of overcoming this difficulty by a combination isomerization-alkylation process in which the used sulfuric acid from the butane-purifying step is used in the alkylation step.

In one specific embodiment this invention comprises a process for the production of a saturated motor fuel of high antiknock value which comprises subjecting a charging stock of normal butane to the action of concentrated sulfuric acid to remove undesirable impurities, separating the acid and normal butane, commingling said normal butane with hydrogen and hydrogen chloride and subjecting said mixture to contact with an anhydrous metal chloride isomerizing catalyst to effect isomerization of substantial portions of the normal butane to isobutane, separating the products from the isomerization step into residual gases, normal butane, and isobutane, commingling said isobutane with isobutane recycle stock obtained from the alkylation step in a manner hereinafter described, commingling the combined isobutane feed with an olefin-containing charging stock and subjecting said mixture to the action of used sulfuric acid obtained from the normal butane purifying step under alkylating conditions to alkylate the isobutane to a saturated material suitable for use as a motor fuel, separating the acid and hydrocarbon products from the alkylation step, fractionating said hydrocarbon products to separate excess isobutane, normal paraffins and alkymer, and commingling said excess isobutane with isobutane formed in the isomerization step to form the combined isobutane feed hereinbefore set forth.

The process is illustrated in the accompanying flow diagram which shows the relationship between the various steps of the process. A commercial source of normal butane is introduced in line 1 wherein it is commingled with concentrated sulfuric acid supplied by way of line 2. The sulfuric acid supplied in line 2 may have a concentration of 92–100% sulfuric acid. The ratio of acid to butane may vary considerably, the optimum value depending upon the percentage of impurities in the charging stock and economic factors based upon recirculation cost and size of equipment. The acid and hydrocarbon are thoroughly mixed in orifice plate type mixers or any other form of equipment known to the art for contacting two immiscible liquids. It has been found that warming the mixture will increase the rate of removal of impurities and the preferred operating temperature is included within the approximate range of 70–200° F.

The mixture of acid and normal butane is removed from the acid-treating zone 3 by way of line 4 and is directed to separation zone 5 wherein the acid is separated from the hydrocarbon layer. The acid layer is removed from separation zone 5 by way of line 6 from which it is directed to line 7 for use in an alkylation step hereinafter described. The purified normal butane is removed from separation zone 5 by way of line 8 in which it is commingled with anhydrous hydrogen chloride and hydrogen supplied by way of line 9. The amount of hydrogen introduced is usually equal to 0.5–5 mole per cent of the butane and the amount of anhydrous hydrogen chloride commonly used varies from 2–20 mole per cent of the charging stock. The mixture of normal butane, hydrogen, and hydrogen chloride is introduced to isomerization zone 10. The isomerization zone includes a reactor containing anhydrous aluminum chloride usually on an inert support and often commingled with other chlorides previously mentioned, such as zirconium chloride. Temperatures of isomerization lie within the approximate range of 50–350° C. under pressure of the order of 1–200 atmospheres and preferably 5–50 atmospheres at temperatures of 100° C. and higher.

The products of the isomerization process consist principally of isobutane and normal butanes, together with hydrogen, hydrogen chloride, and small quantities of other hydrocarbons formed as side reactions in the process and are directed by way of line 11 to separation zone 12. In this separation zone the products lighter than butanes are removed from the system by way of line 13. It will usually be found economical to recover the hydrogen and hydrogen chloride in these residual gases. This may be done by methods well known to the art. Such methods are not shown in the flow diagram as they do not constitute an integral part of the present invention. Separation zone 12 includes a fractionation process for separating normal and isobutane. Normal butane is recycled by way of line 14 to line 8 wherein it is commingled with the normal butane obtained from the purification step. The isobutane obtained in separation zone 12 is removed by way of line 15 wherein it is commingled with an olefin-containing charge introduced by way of line 16. This olefin-containing charge may contain propylene, butenes, higher olefins and mixtures of these olefins either alone or with other hydrocarbons, such as normal paraffins. Any normal paraffins present in the olefin-containing charge merely have a diluting effect and will necessarily be removed at a later stage in the process. Recycle isobutane obtained from the separation step following the alkylating stage as hereinafter described is returned to line 15 by way of line 24. The mixture of isobutane and olefins is introduced to sulfuric acid alkylation zone 17 wherein it is contacted with concentrated sulfuric acid. This concentrated sulfuric acid comprises the used sulfuric acid obtained from the purification of normal butane charging stock and introduced to the alkylation zone by way of line 7 as indicated in the flow diagram. In cases where the normal butane charging stock contains only a small quantity of impurities only a portion of the acid used in the alkylation zone is obtained from the butane-purifying step. In such cases the remainder of the sulfuric acid needed for the alkylation step is introduced from outside sources. This is shown in the flow diagram where some sulfuric acid is diverted from line 2 into line 7. The sulfuric acid used in the alkylation step commonly has a concentration between 88 and 100% and the pressures used in the alkylation stage are such that the reactants are in the liquid state. The temperature used in the sulfuric acid alkylation process varies in the range of about 15–100° F.

A considerable excess of isoparaffin is used in the reaction zone to repress the olefin polymerization reaction. The products of the alkylation process are directed by way of line 18 to separation zone 19. In this zone the used sulfuric acid is separated from the hydrocarbon layer and removed from the system by way of line 20. The used acid from the alkylation step may be used in sulfuric acid treating steps in the refinery or may be purified and concentrated for further use in the process of this invention. The hydrocarbon layer separated from the sulfuric acid is fractionated for separation into alkymer and lighter products. The alkymer boils principally in the gasoline boiling range and is removed by way of line 21 and collected as a product of the process. It may be further re-run to remove the small proportion of heavy bottoms. The composition of the lighter products obtained from the separation zone depends greatly upon the composition of the olefin-containing charge. If the olefin-containing charge is free of paraffins, this lighter fraction will consist principally of isobutane which is recycled by way of line 24 to line 15 and constitutes part of the feed for the alkylation zone. Any low boiling normal paraffins that may be present in the olefin-containing charge, such as propane or normal butane, will be separated in zone 19 and the normal butane, if present, may be directed to the isomerization step by way of lines 23 and 8. If propane is present in the olefin-containing charge it may be removed from separation zone 19 by way of line 22. Additional isobutane if desired may be added to the system by way of line 25 as shown in the figure.

The following example is given to illustrate the usefulness and practicability of my process but should not be construed as limiting it to the exact conditions given therein. A charging stock analyzing 97% normal butane is treated with 98% sulfuric acid at normal temperature. After separation the acid layer is in part used for further treatment of impure normal butane and in part directed to the alkylation step. The proportion of acid and hydrocarbon used is such that the acid drops from 98 to 96% titratable acidity during the purification treatment. Using a catalyst in the isomerization step consisting of 100 parts by weight of activated carbon and 65 parts by weight of aluminum chloride, an isomerization temperature of 200° C. and a pressure of 650 pounds per square, a 51% conversion of normal butane to isobutane per pass is obtained. The normal butane was commingled with 2% by weight of hydrogen chloride and 3 mole per cent of hydrogen before being passed over the isomerization catalyst. In the separation zone following the isomerization step, the hydrogen, hydrogen chloride, and hydrocarbons boiling below isobutane are separated from the higher boiling material and may be recovered if desired or may be discarded as a waste product. The normal butane is separated from isobutane by a distillation process and is recycled to the isomerization zone. The isobutane is commingled with an olefin-containing charge which may contain 61% normal butane, 30% normal butenes, 5% propane, 3% propylene and directed to the alkylation zone for contacting with the used sulfuric acid obtained in the butane-purifying step. Using a total residence time of 25 minutes the olefins in the charge are completely removed. The products from the alkylation stage are then directed to a separation zone wherein the acid is separated from the hydrocarbon layer, the hydrocarbon layer fractionated and the excess isobutane recovered and returned to the alkylation step. The normal butane obtained in the separation zone is commingled with the impure normal butane charging stock. The alkylate is fractionated into a motor fuel and heavy bottoms. The heavy bottoms may constitute approximately 6½% by weight of the total alkylate. The alkylate may contain approximately 85% $C_8$ and 15% lighter hydrocarbons. It may have an initial boiling point of 139° F. and end point of 256° F. The acid heat will be under 20 and the bromine number less than 0.1. The octane number will be approximately 93 by the C. F. R. motor method. When discarding an acid of 92% strength from the alkylation step, the acid consumption will be somewhat less than 1 pound acid per gallon of alkymer.

I claim as my invention:

1. A process for the production of a saturated motor fuel of high antiknock value which comprises subjecting a charging stock of normal butane to the action of concentrated sulfuric acid to remove undesirable impurities, separating the acid and normal butane, commingling said normal butane with hydrogen and hydrogen chloride and subjecting said mixture to contact with an anhydrous metallic chloride isomerizing catalyst to effect isomerization of substantial portions of the normal butane to isobutane, separating the products from the isomerization step into residual gases, normal butane, and isobutane, commingling said isobutane with isobutane recycle stock obtained from the alkylation step in a manner hereinafter described, commingling the combined isobutane feed with an olefin-containing charging stock and subjecting said mixture to the action of used sulfuric acid obtained from the normal butane purifying step under alkylating conditions to alkylate the isobutane to a saturated material suitable for use as a motor fuel, separating the acid and hydrocarbon products from the alkylation step, fractionating said hydrocarbon products to separate excess isobutane, normal paraffins and alkymer, and commingling said excess isobutane with isobutane formed in the isomerization step to form the combined isobutane feed hereinbefore set forth.

2. A process as set forth in claim 1 in which the isomerizing catalyst comprises anhydrous aluminum chloride.

3. A process as set forth in claim 1 in which the isomerizing catalyst comprises aluminum chloride and a chloride selected from the group consisting of zirconium chloride, zinc chloride, cupric chloride and iron chloride.

4. A process as set forth in claim 1 in which the isomerizing catalyst comprises aluminum chloride and zirconium chloride.

5. A process as set forth in claim 1 in which the isomerization process is conducted at a temperature within the approximate range of 50–350° C. and under a pressure of substantially atmospheric to approximately 200 atmospheres.

6. A process as set forth in claim 1 in which the sulfuric acid used in the alkylation zone has a concentration within the approximate range of 88–98% and the alkylation is conducted at a temperature within the approximate range of 15–100° F.

7. A process for producing more valuable products from normal butane and olefins, which comprises subjecting said normal butane to a purifying treatment in the presence of concentrated sulfuric acid, separating the purified normal butane from the used sulfuric acid, subjecting the purified normal butane to catalytic isomerization to form isobutane, separating the isobutane from unconverted normal butane, and alkylating said isobutane with olefins in the presence of a catalyst comprising at least a portion of the used sulfuric acid.

8. A process for producing more valuable products from normal butane and olefins, which comprises subjecting said normal butane to a purifying treatment in the presence of sulfuric acid of a titratable acidity in excess of 88%, maintaining a ratio of acid to hydrocarbon in the treating step of sufficient proportion so that the titratable acidity of the acid after use is not substantially less than 88%, separating the purified normal butane from the used sulfuric acid, subjecting the purified normal butane to catalytic isomerization to form isobutane, separating the isobutane from unconverted normal butane, and alkylating said isobutane with olefins in the presence of a catalyst comprising at least a portion of the used sulfuric acid.

9. A process for producing more valuable products from normal butane and olefins, which comprises subjecting said normal butane to a purifying treatment in the presence of concentrated sulfuric acid, separating the purified normal butane from the used sulfuric acid, subjecting the purified normal butane to catalytic isomerization to form isobutane, separating the isobutane from unconverted normal butane, and alkylating said isobutane with olefins in the presence of the used sulfuric acid.

10. A process for producing more valuable products from normal butane and olefins, which comprises subjecting said normal butane to a purifying treatment in the presence of concentrated sulfuric acid, separating the purified normal butane from the used sulfuric acid, subjecting the purified normal butane to catalytic isomerization to form isobutane, separating the isobutane from unconverted normal butane, and alkylating said isobutane with olefins in the presence of the used sulfuric acid and additional fresh sulfuric acid.

11. A process for producing more valuable products from normal butane and olefins, which comprises subjecting said normal butane to a purifying treatment in the presence of concentrated sulfuric acid, separating the purified normal butane from the used sulfuric acid, subjecting the purified normal butane to catalytic isomerization to form isobutane, and alkylating the resultant isobutane with olefins in the presence of a catalyst comprising at least a portion of the used sulfuric acid.

HERMAN S. BLOCH.